United States Patent [19]

Bühl et al.

[11] 4,236,927

[45] Dec. 2, 1980

[54] METHOD FOR THE MANUFACTURE OF IRON-CONTAINING SINTERED ELECTRODES

[75] Inventors: Horst Bühl, Weinstadt; Manfred Gutjahr, Oberböihingen, both of Fed. Rep. of Germany

[73] Assignee: Daimler-Benz Aktiengesellschaft, Fed. Rep. of Germany

[21] Appl. No.: 936,929

[22] Filed: Aug. 25, 1978

[30] Foreign Application Priority Data

Aug. 26, 1977 [DE] Fed. Rep. of Germany ....... 2738456

[51] Int. Cl.³ ........................... B22F 5/00; B22F 3/00; B22F 1/00
[52] U.S. Cl. ........................ 75/246; 75/200; 75/206; 75/214; 429/221
[58] Field of Search ................. 75/200, 214, 206, 246; 429/221

[56] References Cited

U.S. PATENT DOCUMENTS

| | | | |
|---|---|---|---|
| 2,198,042 | 4/1940 | Schlecht et al. | 429/221 |
| 2,834,825 | 5/1958 | Wenzelberger | 429/221 |
| 3,679,482 | 7/1972 | Hardman | 429/221 |
| 3,802,878 | 4/1974 | Lindstrom | 75/200 |
| 3,836,397 | 9/1974 | Hardman | 429/221 |
| 4,064,331 | 12/1977 | Patton et al. | 429/221 |
| 4,132,547 | 1/1979 | Buzzelli et al. | 75/200 |

*Primary Examiner*—Brooks H. Hunt
*Attorney, Agent, or Firm*—Craig & Antonelli

[57] ABSTRACT

A method for manufacturing an iron-containing sintered electrode for alkaline accumulators as well as the product obtained by such method, in which iron powder and at least one reducible iron compound are intimately mixed with each other; the powder mixture is sintered into a stable body and the reducible iron compound is reduced to highly active iron.

55 Claims, No Drawings

METHOD FOR THE MANUFACTURE OF IRON-CONTAINING SINTERED ELECTRODES

The present invention relates to a method for the manufacture of iron-containing sintered electrodes for alkaline accumulators, in which iron powder is sintered with the use of a filler material, as well as to a sintered electrode which can be made according to the method of the present invention.

Among the negative electrodes in alkaline systems, namely, the zinc, cadmium and iron electrodes, the iron electrode is the most interesting by reason of its sturdiness and its price-favorable starting material. Iron is relatively inexpensive, and can be operated at a sufficiently negative potential with a capacity very favorable as regards weight and volume, even though with a less favorable charge efficiency than zinc or cadmium.

During the operation of an iron electrode, the metallic iron is oxidized during the discharge partly under formation of Fe(OH)$_2$. The potential of this discharge stage lies at $-0.85$ V toward Hg/HgO. With a lower discharge, the bivalent iron is continued to be oxidized to the trivalent stage:

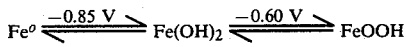

$$Fe^o \underset{}{\overset{-0.85\ V}{\rightleftarrows}} Fe(OH)_2 \underset{}{\overset{-0.60\ V}{\rightleftarrows}} FeOOH$$

During the charging, this reaction proceeds nearly reversibly. The theoretical capacity with respect to weight of an iron electrode lies at 960 ampere hours per kg (Ah/kg). In practice, once reaches capacities of about 200 to 250 Ah/kg because the iron material necessary for producing the electrical energy has to be fixed in a mechanically stable matrix. Since the iron hydroxides are poorer electrical conductors, this matrix has to take care for a sufficient electrical contact of the active iron, respectively, iron oxide granules to the external current conductor. If the electrical contact deteriorates, above all during the discharge, by oxide formation at the granule boundaries, then the polarization increases, and the cell voltage drops which may lead to the complete collapse of the terminal voltage of a battery.

Numerous attempts have already been undertaken to maintain the polarization within acceptable limits, for example, in that one mixes active iron material with nickel flitter (very fine nickel flakes) as conductive substance and stuffs this mixture into steel pockets or small steel pipes. This electrode type is very stable and sturdy; however, it can be operated only with small current strengths.

A galvanic or currentless metalization of the active mass with thin metal layers leads to an increased load-carrying capacity as a result of improved conductivity at the granule boundaries; however, with larger granules, the inside of the granules also remains only insufficiently contacted.

A simultaneous cathodic separation of iron and of a conductive material such as, for example, nickel, entails a further improvement; however, also these electrodes cannot be loaded with the discharge currents necessary in the electro-traction. Additionally, this material is not suited for a further processing into self-supporting frameworks so that also the capacity in relation to weight is too low.

According to a more recent method, fine-grain iron powder is sintered into a porous body which is subsequently filled with iron hydroxide either by electrochemical means or by impregnation with iron salts and subsequent immersion in alkaline solutions. Additionally, a partial oxidation of the iron-sintered body is possible.

In the first method, the filling of the pores with iron hydroxide is only incomplete whereas in the second method, the frame body must not be sintered too much in order to be still able to partially activate the same subsequently. By reason of the insufficient sintering, one has to reckon with an enhanced corrosion of the matrix and therewith with a limited length of life of the electrodes. In order to be able nonetheless to sinter the fine-grain into stable frameworks without activity loss, one has changed over to mix iron powder with a pore former, such as sodium chloride, as a result of which a baking together of the iron granules takes place only to the desired extent and the activity of the fine granules remains preserved. The pore former has to be completely washed out or dissolved again out of the sintered body after the sintering operation in order to avoid disturbances in the operation of the electrode.

In contradistinction thereto, the present invention is concerned with the task to provide an iron-sintered electrode with high capacity and load-carrying ability which is suitable in particular for the electric drive of motor vehicles. The electrode of the present invention is to be capable of manufacture in a simple and cost-favorable manner and should possess a long length of life.

The underlying problems are solved according to the present invention in that the iron powder and at least one reducible iron compound are intimately mixed with each other, the powder mixture is then sintered into a stable, sturdy body and the reducible iron compound is reduced to a highly active iron. The iron compound thus serves as pore former as also as active mass. The iron compound thus no longer needs to be removed out of the sintered framework. Instead, it is merely converted into active iron.

Prior to the sintering, the mixture is advantageously brought into the shape desired for the subsequent application which, for example, can take place by means of a compressing action. Contacting frameworks or contact lugs can thereby be pressed in at the same time. The amount of pressure to by applied during the compressing operation is thereby so selected that porosities will result in the finished electrode between about 60% and about 80%, preferably between about 65% and 70%.

The weight ratio of iron to iron compound in the powder mixture lies appropriately within the range of about 8:1 to about 1:4. With a higher iron proportion, very sturdy electrodes are obtained which can be compressed very highly but, on the other hand, have a somewhat lesser porosity. On the other hand, a high content in reducible iron compounds leads to a high proportion in active mass. Very compact and form-stable electrodes can be obtained also in this case by a subsequent compressing after the sintering operation and by a possible subsequent sintering once more.

Preferably the mixing ratio of iron to iron compound is so selected that, on the one hand, the iron granules possess a sufficient contact to one another in order to produce a form-stable body during the sintering process, while on the other hand, the active iron gained from the iron compound in the subsequent reduction, produces the desired storage capacity.

According to one embodiment of the present invention, the sintering operation is carried out in an inert gas, for example, in nitrogen or argon or in a gas mixture. It can be prevented thereby that the admixed iron compound is reduced to iron during the sintering operation, also if the sintering is carried out over a relatively long period of time, and is then possibly sintered along with the rest. Undesired oxidation occurrences can be avoided, on the other hand, by a slight admixture of reducing gases, for example, by an admixture of about 1% of hydrogen. The sintering time and sintering temperature can be matched to one another, whereby preferably also the mixing ratio of iron to iron compound and the degree of a possibly previously carried out compressing operation are taken into consideration since the same also influence the sintering operation. A high iron content, a strong compression and a high sintering temperature shorten the sintering duration. After the sintering process, the finely distributed iron compound enclosed in the metallic sintered body is reduced to an active fine-grain iron material in hydrogen or in a hydrogen-containing gas mixture, for example, in a hydrogen-nitrogen mixture. Also in this case, an increase of the temperature has as a consequence a shortening of the reaction time.

It is also surprisingly possible to carry out the sintering of the iron powder and the reduction of the iron compound in a single operating step, i.e., essentially simultaneously. The mixture of iron powder and powder-shaped reducible iron compound can also be sintered together in a reducing atmosphere into a stable, shaped body which contains already the active iron obtained by reduction. It has been found in particular that the sintering of the iron granules proceeds faster than the reduction of the iron compound into iron. If one operates under relatively mild conditions, then a stable iron framework results in which highly active iron is embedded without being impaired by sintering.

The iron powder and preferably also the iron compound are used advantageously with a particle size smaller than 30 micrometer, preferably smaller than 10 micrometer. As iron powder is suitable in particular such iron powder which has been made by reduction. In particular FeO, $Fe_2O_3$ or $Fe_3O_4$ as well as mixtures thereof are suitable in particular as reducible iron compounds though other reducible iron compounds can also be used within the scope of the present invention.

Accordingly, it is an object of the present invention to provide a method for making iron-containing sintered electrodes which avoids by extremely simple means the aforementioned shortcomings and drawbacks encountered in the prior art.

Another object of the present invention resides in a method for manufacturing iron-containing sintered electrodes which have sufficient rigidity for the intended use in alkaline storage batteries.

A further object of the present invention resides in a method for producing iron-containing sintered electrodes which can be readily used for discharge currents of the order of magnitudes required for electrotraction of vehicles, especially of electrically driven motor vehicles.

Still a further object of the present invention resides in an iron-containing sintered electrode for alkaline accumulators which is relatively stable and sturdy, can be manufactured in a simple, relatively inexpensive manner and prevents a significant drop in cell voltage during normal operation.

Another object of the present invention resides in a method for making iron-containing sintered electrodes which permits a processing of the electrodes into self-supporting structures, yet is simple and favorable as regards costs and assures a long service life of the electrodes.

A further object of the present invention resides in an iron-containing sintered electrode which has a very large capacity and a high load-carrying capability, yet is relatively inexpensive and offers a relatively long life.

Further objects, features and advantages of the present invention will become more apparent from the following description of some typical examples which are provided herein only for illustrative purposes, but are not to be construed as limitative of the present invention.

EXAMPLE 1

50 g of iron powder with a particle size smaller than 30 μm, made by reduction, are mixed with 10 g $Fe_3O_4$ of similar grain size and are stacked about 10 mm. high while embedding therein a fine-mesh iron lattice serving for contacting purposes, and are compressed into a plate having a thickness of 1.6 mm. and an area of 150 cm$^2$. The plate is sintered at 800° C. during one hour in a pipe oven. Subsequently, the iron oxide enclosed in the sintered iron is reduced in the same pipe oven in hydrogen at 680° C. during two hours. The electrode obtained thereby possesses with a two-hour discharge a capacity of 15 Ah. A special after-treatment or activating of the electrode is not necessary.

EXAMPLE 2

50 g iron powder with a particle size smaller than 30 μm are mixed with 15 g $Fe_2O_3$ with a particle size smaller than 30 μm in a manner similar as in the Example 1 and are compressed into a plate having a thickness of 1.6 mm. with an area of 150 cm$^2$. This plate is sintered in a pipe oven at 780° C. during one hour in nitrogen and is subsequently reduced in hydrogen at 660° C. during three hours. The capacity of this electrode amounts to 15.5 Ah at a two-hour discharge.

EXAMPLE 3

50 g iron powder smaller than 30 μm are intimately mixed with 15 g $Fe_3O_4$ having a particle size smaller than 30 μm in a manner similar as in Example 1 and are compressed into an electrode body having a thickness of 1.6 mm. with an area of 150 cm$^2$. The sintering of the iron powder and the reduction of the iron oxide are carried out simultaneously in continuous heating furnace in a hydrogen atmosphere at 660° C. during one hour. The electrode possesses a capacity of 17 Ah with a two-hour discharge.

In general, the powder mixture which has a weight ratio of between about 8:1 to about 1:4, preferably between about 4:1 to about 1:2 of iron to reducible iron compound is brought into a desired shape prior to sintering, for example, with the use of a compression pressure of about 500 to 2,000 kg/cm$^2$, preferably with the use of a pressure of about 1,000 kg/cm$^2$. Porosities in the finished electrode between about 60% to about 80%, preferably between about 65% to about 70% are desirable. The loosely piled powder mixture is condensed prior to the sintering by compressing it to about seven times, preferably to about five or six times its original density. If the sintering and reduction are carried out in separate sequential method steps, then sintering temperatures between about 550° C. and about 1,100° C. can be used, though a temperature range of about 600° C. to about 800° C. is preferable. The duration of the sintering operation which is preferably carried out in an inert atmosphere, is between about 15 minutes to about 5 hours, depending on such factors as sintering temperature and prior compression as well as mixture ratio. The subsequent reduction which is preferably carried out in hydrogen or in hydrogen-containing gas mixtures, may be carried out at temperatures between about 500° C. and about 1,000° C., preferably between about 500° C. and about 700° C. while its duration is between about 5 minutes to about 10 hours. If the sintering and reduction take place simultaneously, then temperatures between about 500° C. and 1,000° C., preferably between about 550° C. and 850° C. are selected. The duration of the simultaneous sintering and reduction is between about 10 minutes and about 10 hours. As mentioned before, any suitable iron powder may be used, though iron obtained by reduction is preferred. Similarly, any suitable reducible iron compound or compound mixtures may be used with the present invention, though FeO, $Fe_2O_3$ and/or $Fe_3O_4$ and mixtures thereof have proved particularly appropriate. Particle sizes smaller than 30 $\mu$m, preferably smaller than 10 $\mu$m, are used for the iron powder and/or reducible compounds in preferred embodiments of the present invention.

While we have described only a few typical examples of the present invention, it is understood that the same is not limited thereto but is susceptible of numerous changes and modifications as known to those skilled in the art, and we therefore do not wish to be limited to the details described herein but intend to cover all such changes and modifications as are encompassed by the scope of the appended claims.

We claim:

1. A method for manufacturing iron-containing sintered electrodes for alkaline accumulators, in which iron powder is sintered with the use of a filler, comprising the steps of intimately mixing with each other the iron powder and at least one reducible iron compound, sintering the powder mixture into a stable body, and reducing the reducible iron compound into highly active iron.

2. A method according to claim 1, characterized in that FeO, $Fe_2O_3$ or $Fe_3O_4$ as well as mixtures thereof are used as the at least one reducible iron compound.

3. A method according to claim 1, characterized in that the iron and the reducible compound are at a ratio with respect to weight between about 8:1 and about 1:4.

4. A method according to claim 3, characterized in that iron and the reducible iron compound are mixed with each other at a weight ratio between about 4:1 and about 1:2.

5. A method according to claim 3, comprising the step of bringing the powder mixture into desired shape prior to sintering.

6. A method according to claim 5, characterized in that the powder mixture is compressed prior to the sintering.

7. A method according to claim 6, characterized in that a pressure of about 500 to about 2,000 kg/cm$^2$ is used for the compressing of the powder mixture prior to sintering.

8. A method according to claim 6, characterized in that a pressure of about 1,000 kg/cm$^2$ is used.

9. A method according to claim 7, characterized in that the loosely charged powder mixture is condensed prior to sintering by compressing it to at most about 7 times the original density of the loosely charged powder mixture.

10. A method according to claim 7, characterized in that the loose powder mixture is condensed prior to sintering by compressing it to about 5 to 6 times the original density of the loose powder mixture.

11. A method according to claim 9, characterized in that the iron powder is obtained by reduction prior to mixing.

12. A method according to claim 10, characterized in that the iron powder has a particle size smaller than 30 $\mu$m.

13. A method according to claim 10, characterized in that the iron powder has a particle size smaller than 10 $\mu$m.

14. A method according to claim 12, characterized in that the at least one iron compound is a powder having a particle size smaller than 30 $\mu$m.

15. A method according to claim 14, characterized in that the at least one iron compound is a powder having a particle size smaller than 10 $\mu$m.

16. A method according to claim 14, characterized in that the sintering and the reduction are carried out sequentially in separate method steps.

17. A method according to claim 16, characterized in that the sintering is carried out in an inert atmosphere.

18. A method according to claim 17, characterized in that sintering temperatures between about 550° C. and 1,100° C. are used.

19. A method according to claim 18, characterized in that sintering temperatures between about 600° C. and about 800° C. are used.

20. A method according to claim 18, characterized in that the sintering operation is carried out during a period of time of about 15 minutes to about 5 hours.

21. A method according to claim 20, characterized in that the reduction following the sintering is carried out in hydrogen or a hydrogen-containing gas mixture.

22. A method according to claim 21, characterized in that the reduction is carried out at temperatures between about 500° C. and about 1,000° C.

23. A method according to claim 22, characterized in that the reduction is carried out at temperatures between about 500° C. and about 700° C.

24. A method according to claim 22, characterized in that the reduction is carried out during a period of time of about 5 minutes to about 10 hours.

25. A method according to claim 14, characterized in that the sintering and reduction are carried out simultaneously in hydrogen or in a hydrogen-containing gas mixture.

26. A method according to claim 25, characterized in that the simultaneous sintering and reduction is carried out at temperatures between about 500° C. and about 1,000° C.

27. A method according to claim 26, characterized in that the simultaneous sintering and reduction is carried out at temperatures between about 550° C. and 850° C.

28. A method according to claim 26, characterized in that the simultaneous sintering and reduction is carried out during a period of time of about 10 minutes to about 10 hours.

29. A method according to claim 16, 17 or 18, characterized in that FeO, $Fe_2O_3$ or $Fe_3O_4$ as well as mixtures thereof are used as the at least one reducible iron compound.

30. A method according to claim 25, 26 or 28, characterized in that FeO, Fe$_2$O$_3$ or Fe$_3$O$_4$ as well as mixtures thereof are used as the at least one reducible iron compound.

31. A method according to claim 1 or 3, characterized in that the powder mixture is compressed prior to the sintering.

32. A method according to claim 31, characterized in that a pressure of about 500 to about 2,000 kg/cm$^2$ is used for the compressing of the powder mixture prior to sintering.

33. A method according to claim 31, characterized in that a pressure of about 1,000 kg/cm$^2$ is used.

34. A method according to claim 1 or 3, characterized in that the loosely charged powder mixture is condensed prior to sintering by compressing it to at most about 7 times the original density of the loosely charged powder mixture.

35. A method according to claim 1, characterized in that the loose powder mixture is condensed prior to sintering by compressing it to about 5 to about 6 times the original density of the loose powder mixture.

36. A method according to claim 1, characterized in that the iron powder has a particle size smaller than 30 µm.

37. A method according to claim 1, characterized in that the iron powder is a powder having a particle size smaller than 10 µm.

38. A method according to claim 1, characterized in that an iron compound with a particle size smaller than 30 µm is used.

39. A method according to claim 1, characterized in that the at least one iron compound is a powder having a particle size smaller than 10 µm.

40. A method according to claim 1, 2, 3, 36 or 38, characterized in that the iron powder is obtained by reduction prior to mixing.

41. A method according to claim 1 or 3, characterized in that the sintering and the reduction are carried out sequentially in separate method steps.

42. A method according to claim 41, characterized in that the sintering is carried out in an inert atmosphere.

43. A method according to claim 42, characterized in that sintering temperatures between about 550° C. and 1,100° C. are used.

44. A method according to claim 43, characterized in that sintering temperatures between about 600° C. and about 800° C. are used.

45. A method according to claim 43, characterized in that the sintering operation is carried out during a period of time of about 15 minutes to about 5 hours.

46. A method according to claim 42, characterized in that the reduction following the sintering is carried out in hydrogen or a hydrogen-containing gas mixture.

47. A method according to claim 46, characterized in that the reduction is carried out at temperatures between about 500° C. and about 1,000° C.

48. A method according to claim 47, characterized in that the reduction is carried out at temperatures between about 500° C. and about 700° C.

49. A method according to claim 47, characterized in that the reduction is carried out during a period of time of about 5 minutes to about 10 hours.

50. A method according to claim 1 or 3, characterized in that the sintering and reduction are carried out simultaneously in hydrogen or in a hydrogen-containing gas mixture.

51. A method according to claim 50, characterized in that the simultaneous sintering and reduction is carried out at temperatures between about 500° C. and about 1,000° C.

52. A method according to claim 51, characterized in that the simultaneous sintering and reduction is carried out at temperatures between about 550° C. and 850° C.

53. A method according to claim 51, characterized in that the simultaneous sintering and reduction is carried out during a period of time of about 10 minutes to about 10 hours.

54. An iron containing sintered electrode made according to the method of claim 1, 3, 15, 25, or 45.

55. An iron containing sintered electrode comprising a stable body formed by intimately mixing iron powder and at least one powdered reducible iron compound, sintering the resulting powder mixture and reducing the iron compound to a highly active iron within said stable body.

* * * * *